United States Patent [19]

Le Vantine

[11] Patent Number: 4,496,375
[45] Date of Patent: Jan. 29, 1985

[54] AN ELECTROSTATIC AIR CLEANING DEVICE HAVING IONIZATION APPARATUS WHICH CAUSES THE AIR TO FLOW THERETHROUGH

[76] Inventor: Allan D. Le Vantine, 18225 Rancho St., Tarzana, Calif. 91356

[21] Appl. No.: 504,273

[22] Filed: Jun. 14, 1983

Related U.S. Application Data

[63] Continuation of Ser. No. 282,420, Jul. 13, 1981, abandoned.

[51] Int. Cl.³ .............................. B03C 3/12; B03C 3/82
[52] U.S. Cl. ........................................ 55/131; 55/137; 55/138; 55/146; 55/152; 55/385 A; 55/420; 422/121; 361/230
[58] Field of Search ................................. 55/128–131, 55/137, 138, 146, 152, 155, 279, 385 A, 418, 420; 422/121; 361/230

[56] References Cited

U.S. PATENT DOCUMENTS

| | | | |
|---|---|---|---|
| 1,342,651 | 6/1920 | Squires | 55/152 |
| 1,343,482 | 6/1920 | Schmidt et al. | 55/130 |
| 1,428,839 | 9/1922 | Fortescue | 55/146 |
| 2,220,833 | 11/1940 | Young | 55/128 |
| 2,327,588 | 8/1943 | Bennett | 55/152 |
| 2,532,734 | 12/1950 | Schmidt | 55/129 |
| 2,571,079 | 10/1951 | Warburton | 55/155 |
| 2,841,241 | 7/1958 | Eilenberger | 55/155 |
| 2,990,912 | 7/1961 | Cole | 55/131 |
| 3,533,222 | 10/1970 | Gasperini | 55/131 |
| 3,668,836 | 6/1972 | Richardson et al. | 55/131 |
| 3,981,695 | 9/1976 | Fuchs | 55/152 |
| 4,191,543 | 3/1980 | Peters | 55/279 |
| 4,264,343 | 4/1981 | Natarajan et al. | 55/152 |
| 4,279,625 | 7/1981 | Inculet et al. | 55/131 |
| 4,321,066 | 3/1982 | Masuda | 55/128 |

FOREIGN PATENT DOCUMENTS

| | | | |
|---|---|---|---|
| 1901981 | 8/1970 | Fed. Rep. of Germany | 55/152 |
| 47701 | 1/1977 | Japan | 55/137 |
| 47810 | 10/1978 | Japan | 55/155 |
| 179897 | 4/1966 | U.S.S.R. | 55/152 |
| 629981 | 10/1978 | U.S.S.R. | 55/129 |

Primary Examiner—David L. Lacey

[57] ABSTRACT

An air cleaning device including an electrostatic apparatus which removes particulates from the air by causing them to be precipitated on an electrically charged grid. The device includes a dielectric conduit structure, open at both ends. One end is the air inlet and the other is the air outlet. Three sets of electrically charged elements are positioned within the conduit. Starting just within the inlet end, they are, in order: (1) a first grid structure maintained at a high negative electrical potential: (2) a needle electrode also maintained at a high negative electrical potential: (3) a second grid structure maintained at a high positive potential. The air molecules and particulates are charged negatively by the needle electrode and are forced away from the negatively charged first grid structure and drawn toward the positively charged second grid structure, by electrostatic forces, causing the air to move through the conduit. The negatively charged particulates are attracted to and precipitated on the second grid structure.

14 Claims, 8 Drawing Figures

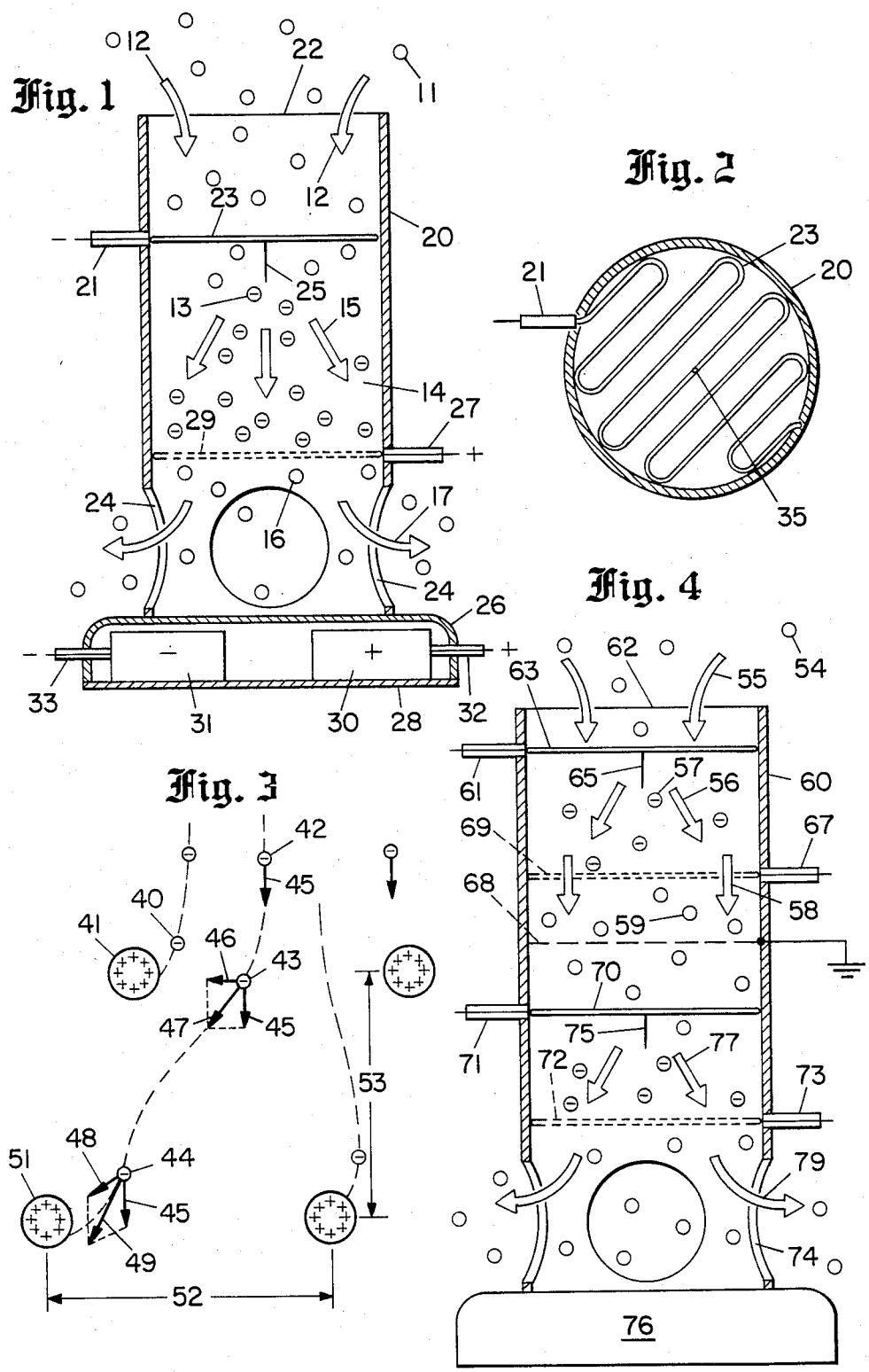

AN ELECTROSTATIC AIR CLEANING DEVICE HAVING IONIZATION APPARATUS WHICH CAUSES THE AIR TO FLOW THERETHROUGH

This is a continuing application of prior application Ser. No. 282,420 filed July 13, 1981, abandoned.

This invention relates to the removal of particulates from air and, more specifically, to a device that ionizes air and airborne particulates and causes them to flow therethrough, by electrostatic means, and simultaneously removes particulates from the air stream by causing them to be precipitated on a charged grid component which is part of the air flow system.

Electrostatic precipitators have been in use for many years. Most applications have been oriented to eliminating smoke or dust for heavy industrial purposes and for the improvement of these systems. The use of electrostatic precipitators for cleaning air is not wide spread although many patents have been issued for devices in connection with this purpose. Examination of many of these patents reveals the claims to be oriented primarily to novel elements and arrangements for use in existing convection systems. For example, in U.S. Pat. No. 3,800,509 air is made to flow between two fabric elements of opposite polarity. U.S. Pat. No. 4,205,969 incorporates honeycomb filter elements. U.S. Pat. No. 3,668,836 utilizes a grounded plate upstream of charged wires. U.S. Pat. No. 2,973,054 creates a corona discharge to ground as a means of charging particulates and collects them on a grounded grid covered with a viscous material to make them adhere. Some patents also include a convection system such as U.S. Pat. No. 3,222,848 which has a means for forcing air through the device.

All of these devices are either concerned with providing what is termed a better corona discharge to improve ionization and for electrically charging particulates, or for better electrostatic collection components to improve overall efficiency. In contrast, the present invention, using the same principles, provides a means by which air is additionally accelerated through the device and incorporates new concepts for the precipitation and collection of particulates from air.

Before describing the details of the invention it is important, for clarity, to review and define some of the physical principles and the mechanics which serve as the basis of the invention. First, it should be recognized that electric current consists of a flow of electrons. And as electrons, by convention, are the elements of negative electric charge, an electric current will flow from a source at a negative potential to a receiver at a positive potential. In the same manner a particle receiving a charge from a negative electrode of an electrical generator must travel to the positive electrode of that generator in order for an electrical current to exist. Fortunately physical law tends to cause this flow, or travel, to exist. Two mechanisms are involved. First, like charges tend to repel each other. Thus, once the particle receives a negative charge it is repelled from the negative electrode from which it received that charge because it has the same charge as that electrode. Second, opposite charges attract each other. Therefore, the negatively charged particle is attracted toward a positive electrode because the positive electrode has the opposite charge.

In a vacuum the particle would be accelerated rapidly from negative to positive electrodes (neglecting gravitational effects) creating an ion current. In air, the charged particle continually collides with air molecules which interfere with its passage. In addition, these collisions result in a transfer of some of the charge of the particle to the air molecules, or to other particles it collides with, depleting its charge but also creating additional negatively charged elements and ions. Ultimately the particle and other accompanying particles and ions reach the positive electrode and give up their charge. Of course ions are formed by charging molecules with electrons directly at the negative electrode. And, these ions collide with particles and either become affixed to the particles or give up their charge to the particles. The existence of ions and charged particles in a gas is sometimes referred to as a corona because, under certain circumstances, a faint light is emitted by the decaying of molecules and atoms from higher to lower energy states near the surface of a high voltage conductor.

In air the negatively charged particles and molecules will still move away from the negative electrode and toward the positive electrode. However, their velocity is limited by the mass of gas that must be displaced by their movement. For example, if the negative and positive electrodes are located axially within a tubular structure, the flow of charged particles from negative to positive will result in movement of the entire column of air within the tube through the same distance. Calculation of the parameters and values to achieve a given velocity are determinable, but not by electrostatic methods. The interactions of electric fields and the complexities involved make solutions by this method impractical. However, energy considerations can be used to relate voltage potentials and electron flow to the flow rate of air through a system.

If a sufficiently high density of charged and ionized molecules exists between the negative and positive electrodes a bridge will occur through which electrons will transfer from ion to ion resulting in a free flow of electrons whereby only the electrons move while the ions remain relatively stationary. This occurance is referred to as an arc. An arc results in a significant dissipation of energy in the form of heat and light and results in certain chemical changes of the air. Hence, arcing is to be avoided in the design of this invention.

It has been observed that a sharp point on an electrode is far more effective in creating charged particles or ions than a smooth surface. Although little explanation is given in the literature for this seeming phenomenon, it is apparent that the surface charge density must be considerably greater at a sharp point that at smooth areas of a charged body. This has been partially explained by F. W. Sears in his "Principle of Physics" by considering the electric intensity about an electrode at some distance away from that electrode. At a sufficient radius about a charged body of irregular shape, the equipotential lines of electric intensity appear spherical. Hence, the lines of electric force, which are perpendicular to the lines of intensity, point toward a common center at some point within the body. However, as one plots the equipotentials and lines of force closer and closer to the body the equipotential lines will deviate from spherical and approach the irregular shape of the surface. The lines of force which are always perpendicular to the equipotential lines will thus tend to become close together about any sharp positive curvature on the surface and far apart on any area of little curvature or negative curvature. Thus, in a sense, it is reasonable to equate electric lines of force at a surface with the angular change of that surface, and to recognize that the lines of force over any increment of the surface of an electrically charged body are proportional to the positive angular change of that surface increment.

From the foregoing argument it can be concluded that a point on an electrode which presents a significantly large angular change in a surface, produces a significant number of lines of force, and because the sharpness of the point represents a very small surface area, the surface density of charge at the point is considerably greater than other areas of the electrode. Therefore, a point because of its high charge density, is far more capable of transferring a charge to atmospheric particles and molecules adjacent thereto, than a blunt rounded surface.

Additional reasoning can be applied to augment this idea if one recognizes that the surface charge on a body is affected by the presence of surrounding charges. As is discussed in many texts, a like charged element positioned near a charged body will have the effect of forcing the surface charges of that body away from the area that is nearest the like charged element. This concept provokes the recognition of two factors that bear on the effectiveness of a sharp point as an electrode.

A sharp point electrode at a high potential charges elements in the surrounding atmosphere with like charges forming a charged field. These like charges react with a repulsive force on the surface charge of the electrode causing the surface charge density to vary inversely proportional to the surface area opposing the charge. As the point of the electrode has the least surface area opposing the charged field the surface charge density at the point will be least affected, whereas the sides of the electrode which present a considerably larger area will be most affected. Thus, the surface charges will, by electrostatic force, move away from the sides of the electrode toward the point increasing the concentration at that location.

A second factor, and one that can be used in design to increase the surface charge density at the point of an electrode, is the use of strategically placed like charged structures about the electrode. Such structures can be made to further concentrate the surface charge density at the point of the electrode as may be required.

When a negatively charged particle or ion makes contact with a positive electrode it gives up its charge to that electrode. In addition, the particle will remain in contact with the electrode for varying periods of time depending on other factors. A gas molecule forming a weak chemical bond with the surface of the electrode probably will be quickly dislodged by the impact of other gas molecules. In contrast, particles impacting on a positive electrode appear to dislodge adhering gas molecules and to more strongly adhere to the electrode. The strength of the bond is due partly to the composition and size of the particle and partly to the material of which the electrode is constructed.

Materials suspended in air are referred to as particulates. Some of the particulates normally present and their sizes in microns are: tobacco smoke 0.01 to 0.15; oil smoke 0.3 to 1.0; dust particles, less than 10; pollens 20 to 60; plant spores 10 to 30; bacteria 1 to 15. Removal of these particulates by filters have certain physical limitations. They are effective to particusizes down to about 1 micron, they have a high resistance to the flow of air and their porosities readily plug up requiring frequent replacement. In contrast, electrostatic filters have no lower size limit of particulates that can be removed from air. They do not plug up and they require very little servicing.

It is an objective of the present invention to provide an improved device for the removal of particulates from air by electrostatic methods.

It is another objective of this invention to move an airstream through the particulate removing device by electrostatic methods.

It is yet another objective of this invention to provide an improved method for negatively charging particulates and air molecules.

It is further an objective of this invention to provide an improved positive electrode grid for collecting particulates from the airstream.

Briefly stated and in accord with the presently preferred embodiments of the invention, a conduit structure is provided, composed of a dielectric (non-electrically conductive) material, open at both ends. One end is identified as an inlet and the other as an outlet. Three sets of electrically charged elements are positioned within the conduit in the following order starting just within the inlet end: (1) a first grid structure maintained at a high negative electrical potential; (2) a needle electrode also maintained at a high negative potential; (3) a second grid structure maintained at a high positive electrical potential. The needle electrode is located in close proximity to the first grid structure, whereas the second grid structure is located a discernable distance toward the outlet end from the needle electrode.

Air and particulates enter the device at the inlet end, pass through the first grid and into the region of the needle electrode. The needle electrode, by nature of its shape and high negative electrical potential, dispenses a negative electrical charge to both particulates and air molecules. Once charged these particulates and molecules are resultingly propelled toward the outlet end of the device by reason of the repulsion force from the like charged first grid and the attraction force from the opposite charged second grid. In passing into the second grid the particulates and molecules give up their negative charge as they make contact with the grid. The particulates remain bonded to the second grid and are thus removed from the air stream while the air molecules are forced out of the device by reason of the movement of the air column within the conduit. Thus, the device causes air to be passed through it and in the process removes particulates from the air.

Five embodiments of the invention which relate to adaptations for different applications are described below. For a complete understanding of the invention and these embodiments with an appreciation of the objectives and ramifications thereof, please refer to the attached drawings and the following descriptions of the drawings in which:

FIG. 1 is a cross section through a first embodiment of the invention.

FIG. 2 is a plan view of grid 23 of FIG. 1.

FIG. 3 is a diagram through a section of the positive grid showing the paths and the forces acting upon charged molecules or particulates passing through the grid.

FIG. 4 is a cross section through a second embodiment of the invention.

Figure 5:
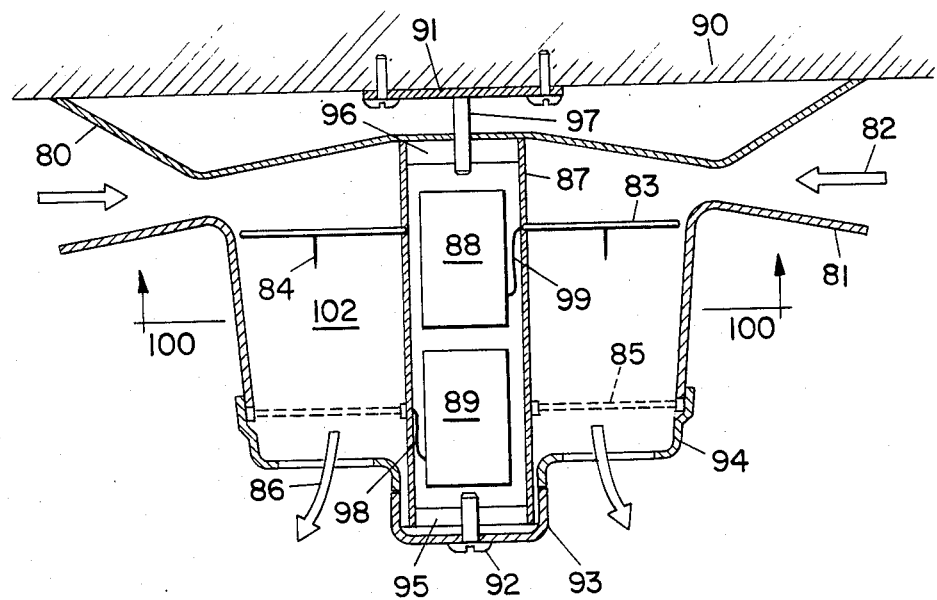
FIG. 5 is a cross section through a third embodiment of the invention.

The embodiments of the invention are envisioned, but not limited to, being utilized as air cleaners for individual rooms such as those that might be found in a home, office, laboratory, hospital, restaurant or other public and private places. The first embodiment of the principle of the invention to be described is shown in FIG. 1. FIG. 1 represents a stand alone configuration that can be placed on a table or a ledge or a counter. It consists of a vertical hollow cylindrical structure 20, made of a dielectric mounted on a hollow base 26, also made of a dielectric material, and closed by a base plate 28. Within the cylinder and near its upper end is positioned a metal grid 23 which is supplied with a high negative voltage through insulated conductor 21. Affixed to the center of grid 23 and extending vertically downward from its lower surface is metal electrode 25. Electrode 25 is also supplied with a high negative voltage by reason of its continuity with grid 23. Near the lower end of the cylinder 20 and just above openings 24 a second metal grid 29 is located. Grid 29 is supplied with a high positive voltage through insulated conductor 27. Within the hollow base formed by 26 and 28 are located the high voltage generators, positive 30 and negative 31 to supply the grids.

Approximate dimensions for this embodiment of the invention are as follows. Cylinder 20 is 4 inches in diameter and 10 inches long with a wall thickness of ⅛ inch. Grid 23 is located 3 inches below the upper end of cylinder 20. Electrode 25 is one inch long. Grid 29 is 4 inches below grid 23 and 3 inches from the tip of electrode 25. Openings 24 are 2 inches in diameter. Although these dimensions are typical this embodiment is not limited to this size.

Air molecules and particulates 11 enter the device through aperture 22 at the top of the cylinder as indicated by arrows 12. They pass through negatively charged grid 23 and into the region of the tip of negatively charged electrode 25. By reason of the fact that electrode 25 has a sharply pointed tip a high negative charge density is developed at the pointed tip. This normally high charge density at the point is increased, by the presence in close proximity of negative grid 23, resulting in a significantly high negative electric intensity adjacent to the point of electrode 25, and results in the transfer of a negative electric charge to all molecules and particulates that come in close proximity to the electrode point, as indicated by molecule or particulate 13.

Once a molecule or particulate has received a negative charge it is repelled by the force resulting from the like charged electrode 25 and grid 23 and is propelled in a preferential downward direction as indicated by arrows 15. Negative molecules and particulates leaving the region of the electrode contact and and interact with other molecules and particulates of the air transferring some of their charge to these elements. Thus, ultimately at some point below the electrode and within the confines of the cylinder the column of air 14 as a whole is electrically charged negative.

The negatively charged air column is influenced by the attractive force of the positively charged grid 29 causing the air column to be additionally propelled toward that grid. Upon reaching grid 29 the molecules and particulates give up their charge to the grid. The air molecules pass through the grid by reason of the movement of the air column through the cylinder. The particulates remain adhered to the grid by a weak mechanical or chemical bond and are thus removed from the air column. The molecules 16 that have passed through grid 29 continue through outlet ports 24, as indicated by arrows 17, and back into the air mass outside the device.

Referring to FIG. 2 the negative grid 23 is constructed in a manner so as to keep a low charge density along its surfaces in order to minimize electrically charging particles outside the device. This may be accomplished by making the grid from large diameter wire and eliminating any sharp points or edges. In this embodiment the grid is formed from one continuous piece of 11 gauge wire. In the design of negative grids for some embodiments of the invention it might be necessary to insulate the grid by coating it with a dielectric material. When the negative grid is supplied with a sufficiently high voltage, an insulating coating is required to prevent the charging of molecules and particulates before they pass through the grid. Negatively charged molecules and particulates ahead of the negative grid will be repelled in a direction counter to the flow of air through the device and thereby would impede the performance of the device. Point 35, FIG. 2, is the location of the attachment of negative electrode which projects downward below the grid.

Negative electrode 25 is a needle-like structure about 0.025 inches in diameter and one inch long. Its upper end is bonded by soldering grid 23. The needle electrode has a smooth polished surface and its lower end is fashioned into a polished fine sharp point. Such needles traditionally, as in this case, are made from high quality hardened steel. As the point of the needle electrode tends to erode with use, its life can be extended by plating it with a more durable material such as gold or platinum. The needle and the grid are supplied with a potential on the order of minus 20,000 volts from negative high voltage generator 31, FIG. 1, via a connection between leads 33 and 21.

Positive grid 29 consists of several layers of metal screen held together to produce a torturous course for the charged air and particulates to flow through. The number of layers depends on the size and spacing of the wire and their effect in impeding the flow of air through the device. The impedence must be kept at a minimum in order to preserve efficiency, as it is in any air flow device. In this embodiment the grid is composed of 5 layers of 16 per inch mesh aluminum screen made from 30 gauge wire. Aluminum is used because it reacts favorably with many particulates resulting in their becoming bonded to the screen. The positive grid is supplied with a potential on the order of about plus 20,000 volts from positive voltage generator 30 by means of a connection between lead 32 and lead 27.

The values given above are examples and are not meant to limit the dimensions of magnitudes consistent with the principles of the invention.

The principles which define the interactions between the moving air column, the negatively charged molecules and particulates and the positively charged grid wires are diagrammed in FIG. 3. These principles form the basis for the design of the grid and for determining the size and spacing of the wires and the number of layers required.

Referring to FIG. 3, molecule or particulate 40 follows a curved path under the influence of the attractive force between the negative charge of 40 and the positive charge of grid wire 41. These forces are represented, along the path of molecule or particulate 44 through positions 42 and 43, by vector notation (direction arrows whose length represents in this case velocity). In position 42 the vector 45 indicates the velocity of the moving air column which is the only factor affecting the element. In position 43 the proximity of positive grid wire 41 results in an attractive force, in the direction of vector 46, reacting on the molecule or particulate causing an acceleration resulting in a velocity, the momentary magnitude of which is represented by vector 46. The effect of this factor is that a new direction is taken by the molecule or particulate as indicated by vector 47 which is the vector sum of vectors 46 and 45.

Continuing along the pathway of the molecule or particulate to position 44, the attractive forces between the element and grid wire 51 results in velocity vector 48 which alters the path to momentary velocity vector 49 and leads to the ultimate intersection of the molecule or particulate with grid 51.

In the design of the positive grid, such as 29 FIG. 1, the grid wire size and the grid wire spacing 52, FIG. 3, must be considered primarily to set the allowable impedence to the passage of air. The layer separation 53 and the velocity of the air column ultimately determine the number of grid layers that are required to intercept a designated percentage of the particulates passing through the device. In design, layers are added until the desired results are reached.

A second embodiment of the invention is shown in FIG. 4. This embodiment is similar to that previously discussed except that it utilizes two stages of ion pumping in series. It is housed in a hollow cylindrical structure 60 mounted on a base 76. The active grids and electrodes are mounted within the cylinder. Referring to the figure, molecule or particulate 54 enters the device through the upper open end 62 of cylinder 60 as indicated by direction arrows 55. Passing through negative grid 63 the molecule or particulate receives a negative charge directly or indirectly from electrode 65, as indicated by charged molecule or particulate 57, and is propelled in direction 56 toward positive grid 69 where it gives up its charge and proceeds onward through the cylinder, as indicated by arrows 58, by reason of the movement of the column of air through the device. Molecule or particulate 59 proceeds through grounded screen 68 which serves to electrically separate the first propelling stage just described, from the second propelling stage below.

The second stage is identical to the first consisting of negative grid 70, negative electrode 75 and positive grid 72. The molecules or particulates are negatively charged by the electrode and propelled toward the positive grid, as above, and exit the apparatus through openings 74 as indicated by arrows 79.

In this embodiment the propulsion of the first stage is augmented by the propulsion from the second stage. Thus, the velocity of the air flow through this embodiment approaches twice the velocity of that of the first embodiment of the invention shown in FIG. 1 for grid and electrode potentials of the same value. In the embodiment of FIG. 4, particulates are collected on both positive grids 69 and 72. Thus, in addition to the faster action this device is more effective in removing particulates from the air. It is envisioned that devices with more than two stages of ion propulsion in series may be constructed to meet requirements for higher pumping velocities and for more proficient air cleaning.

A third embodiment of the invention is shown in FIG. 5. The design of this embodiment is presented as an air cleaning device that is ceiling mounted. The principle feature in this embodiment is that it incorporates a multiplicity of the basic ion propulsion units, shown in FIG. 1, in a parallel arrangement within one envelope. This device is constructed about a central tubular structure 87 which is closed at the lower end by plate 95 and at the upper end by plate 96. The tube and its closures are made of non-electrically conductive plastic. Within the tube are mounted the negative high voltage generator 88 and the positive high voltage generator 89. The tube is affixed to the ceiling by means of threaded stud 97, which screws into a threaded hole in upper closure 96. Stud 97 is welded to steel mounting plate 91 which is bolted to the ceiling.

Tube 87 supports disc 80 which forms the upper surface of the entry aperture and the upper wall of the interior cavity 102 of the device. Cowl 81 forms the lower surface of the entry aperture and in conjunction with bezel 94 the outer wall of interior cavity 102. Bezel 94 is supported by cap 93 which is held in place over the lower end of the tube 87 by screw 92 which engages a threaded hole in end closure 95. Bezel 94 in turn supports cowl 81. All these items with the exception of the screw 92 are fashioned from electrically non-conducting plastic.

Within the cavity 102 is mounted the negative grid 83 which is supported from tube 87. Negative electrodes 84, of which there are a plurality (in this design eight are used), are soldered to the negative grid. Positive grid 85 rests in a step in bezel 94. The positive grid is connected to the positive high voltage generator 89 by insulated cable 98, from which it receives a continuous positive high voltage charge. Negative grid 83 is connected to negative high voltage generator 88, by insulated cable 99, from which both grid 83 and electrodes 84 receive a continuous negative high voltage charge.

Figure 6:
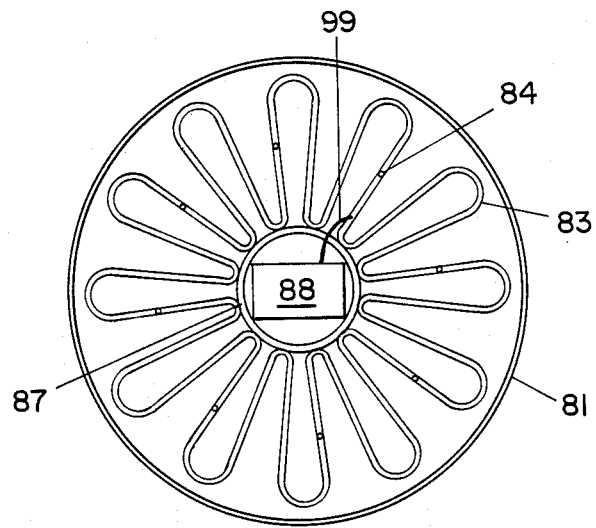
FIG. 6 is a sectional view along line 100—100 of FIG. 5.

The design of negative grid 83 and the location of the electrodes 84 are shown in FIG. 6. FIG. 6 is a cross section along line 100—100 of FIG. 5, looking in an upward direction. Grid 83 is formed of a continuous section of 11 gauge wire shaped into a twelve leaf petal arrangement. Electrodes 84 are soldered to grid 83 so as to be equally spaced from each other and equal distant from the outer wall formed by cowl 81 and the inner wall formed by tube 87. Grid 83 is held in place by fitting into a circumferential groove in tube 87.

The design of the positive grid is similar to that described in the first embodiment with the exception that it is larger in diameter and has an opening in its center so as to fit around central tube 87.

The dimensions of this design featuring this third embodiment of the invention are, 18 inches in diameter for disc 80, 8 inches in diameter at the upper portion of the cavity 102 tapering down to 7 inches in diameter at the positive grid. The unit is approximately 9 inches from top to bottom. Electrode and grid separations and voltages are the same as that for the first embodiment.

In operation air molecules and particulates enter through the circular aperture formed between disc 80 FIG. 5 and cowl 81 as indicated by arrows 82. They pass through negative grid 83 and are given a negative charge through electrodes 84. The region surrounding each electrode and extending downward to the positive grid reacts as an individual propulsion unit in the manner of the first embodiment. Thus, as there are eight electrodes in this design, there are eight separate but contiguous propulsion units within the cavity acting in parallel.

The charged molecules and particulates flow downward under the repulsion of the negative grid 83 and attraction of the positive grid 85, pass through the positive grid where they give up their charge and where most of the particulates are deposited. The remaining air continues on and exits through openings shown by arrows 86.

Figure 7:
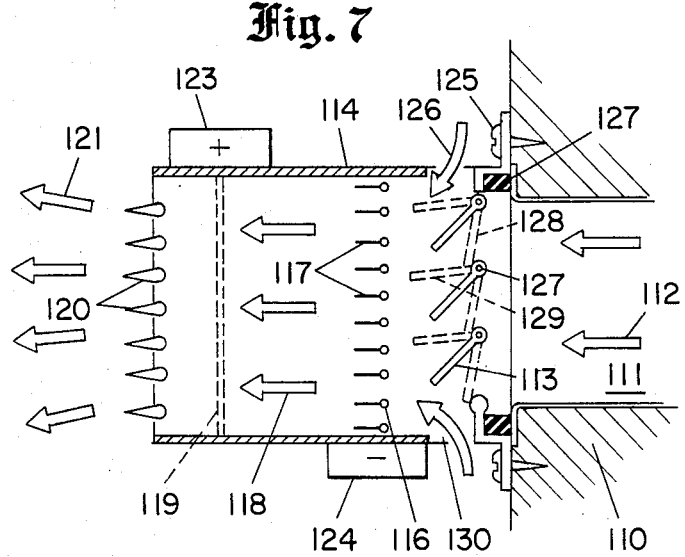
FIG. 7 is a cross section through a fourth embodiment of the invention.

A fourth embodiment of this invention is shown in FIG. 7. This embodiment is used as an adjunct to an existing central heating, cooling or ventilating system which operates intermittently. Its use is to augment such a system, and more specifically to augment a particular room serviced by the system, for the purpose of providing cleaning of the air of that room. This embodiment performs two functions. First it serves as a precipitator removing particulates from the air stream from the ventilator. Second it serves to pump room air through the particulate precipitator both when the ventilating system is on and when it is off.

Referring to FIG. 7, which shows a cross section of this embodiment, the unit is mounted over the face of the ventilator outlet. It is housed in a case means 114 which is attached to the wall 110 by screws 125. Within the case are gravity operated dampers 113 which are freely suspended on pivots 127 at their upper edge, negative grid 116, negative electrodes 117, positive grid 119 and outlet louvres 120. Mounted externally to the case means are positive high voltage generator 123 and negative high voltage generator 124. All components except the grids and high voltage generators are made of non-electrically conductive plastic.

When the ventilating system is operating, air from the system's central blower passes along duct 111 in direction of arrows 112. The flow of air forces dampers 113 to open to position 129 by overcoming the gravitational effect which tends to keep them closed, so that the air continues on through them and passes through the negative grid 116 and into the vicinity of negative electrodes 117. The negative electrodes impart a negative charge to the air molecules and particulates. The flow continues in the direction indicated by arrows 118 and through positive grid 119 where the molecules and particulates give up their negative charge and to which most of the particulates adhere. The remainder of the air continues on through louvres 120 and out into the room as indicated by direction arrows 121.

When the central ventilating system is not operating, dampers 113 close by reason of the force resulting from their mass and gravity reacting in a downward direction about the pivots 127. With the dampers in the downward position 128, the ventilating duct 111 is closed so that no air will be drawn from the duct into the room. The ion pumping of this embodiment of the invention now becomes the primary air moving force. Air now enters through room inlet ports 130 as indicated by direction arrows 126. It passes through negative grid 116 into the region of negative electrodes 117 where the molecules and particulates are charged negatively and propelled toward positive grid 119. Upon reaching the positive grid the molecules and particulates give up their negative charge. The molecules pass through the grid and the particulates remain adhering to the grid. The air then passes through the louvres 120 and is returned to the room.

Thus, this embodiment serves to continually clean the air in a room whether or not the ventilating system is operating. When the ventilating system is operating it appreciably removes particulates from the incoming stream by electrical precipitation. When the ventilating system is not operating it continues to recirculate the air and remove the particulates. Further, it should be additionally appreciated that even when the ventilating system is operating the device continues to draw room air into the room inlet ports 130 and thus recirculates room air through the cleaning system.

As an alternate design, the dampers of this embodiment are also envisioned as being spring loaded against the flow of air from the central ventilating system. Torsion springs about the pivots 127 of the dampers 113 would be used to keep the dampers closed. Pressure against the damper from the flow of air of the ventilating system would overcome the spring force causing the damper to open, allowing the air to flow. The use of this spring method would enable the dampers to be oriented at any angle eliminating the design limitations imposed by the gravity method discussed above.

Figure 8:
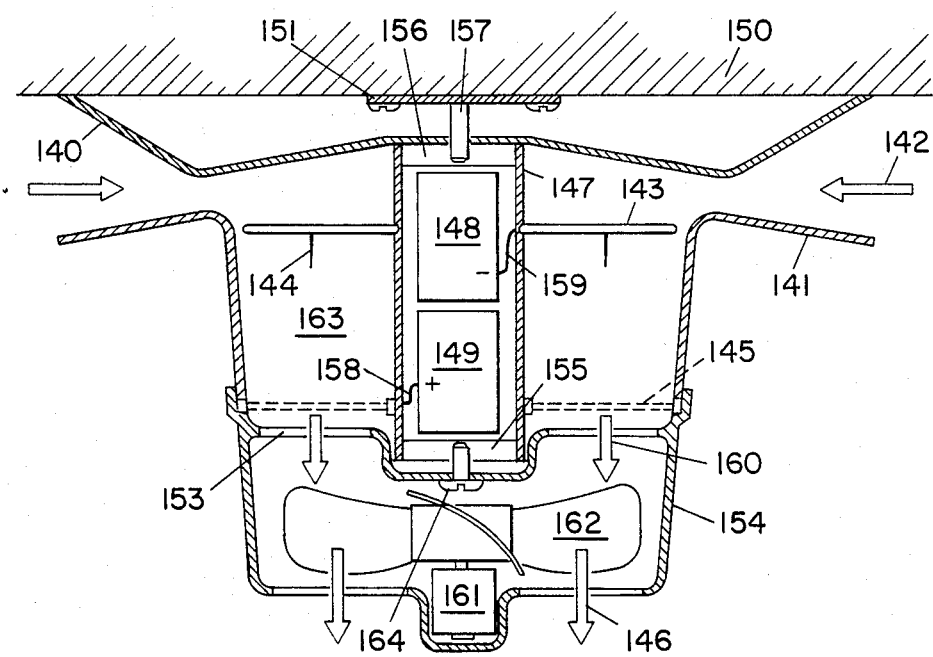
FIG. 8 is a cross section through a fifth embodiment of the invention.

A fifth embodiment of the invention is shown in FIG. 8. The design of this embodiment is presented as a ceiling mounted air cleaning device similar to that described for the third embodiment, FIG. 5, except for the addition of a fan (or blower) below the exit ports. The fan serves to augment the air flow through the device thus increasing the pumping speed over that which would occur from ion pumping alone.

Similar to the third embodiment the device is constructued about a central tubular structure 147 which contains the high voltage generators, negative 148 and positive 149. The tube is affixed to the ceiling 150 by mounting plate 151 and contiguous threaded stud 157 which screws into upper end closure 156 of central tubular structure 147. Disc 140 attached to structure 147 forms the upper surface of the entry aperture. Cowl 141 forms the lower surface and also the outer wall of the interior cavity 163 of the device. Bezel 154 provides a receptacle for the positive grid 145 and also serves as a shroud for fan 162 and a mount for fan drive motor 161. Plate 153, which is integral with bezel 154, also serves to hold the bezel in place by means of screw 164 which screws into lower closure 155 of tubular structure 147. Bezel 154 in turn supports cowl 141.

Within the cavity 163 is mounted the negative grid 143 and a plurality of negative electrodes 144 attached thereto. The negative grid and electrodes are connected to negative high voltage generator 148 by means of insulated cable 159. The positive grid is connected to positive high voltage generator 149 by means of insulated cable 158.

In operation air molecules and particulates enter the device as shown by arrows 142. They pass through negative grid 143, are given a negative charge by electrodes 144, and are propelled toward positive grid 145. Passing through the positive grid the molecules and particulates give up their negative charge. The particulates tend to remain on the positive grid while the air molecules continue on, as indicated by direction arrows 160, and are additionally propelled by fan 162 before passing out of the device as indicated by arrows 146.

In the foregoing discourse the principles of the invention are disclosed and five embodiments are described in detail. It is not intended that the invention be limited to these embodiments. It should be recognized that many modifications will occur to those skilled in the arts encompassing the technical and practical fields which are utilized in the conceptual realization of this invention. It is intended that the invention cover such modifications and be limited in scope only by the appended claims.

What is claimed is:

1. A device for pumping air and collecting airborne particulates by electrostatic techniques comprising:

a case means, tubular in shape and constructed of electrically non-conductive material, for supporting the components of the device and for providing a channel for the convection of air through the device, having a first opening for the admittance of air and having a second opening for the exit of air, between the openings and within the case means are the following:

a first grid means located near the first opening and positioned in a plane orthagonal to the axis of the case means occupying the entire plane extending to the internal surface of the wall of the case means, said first grid means formed of metal wire of circular cross section, said first grid means is connected to a negative high voltage source, said first grid means is constructed and arranged so as to provide a defined negative field across the convection channel within the case means to repel negatively charged molecules and particulates, generated within the case means, away from the first opening and causing them to flow toward the interior of the case means;

an electrode means, adjacent to the first grid means located near the center of the first grid means and on the side of the first grid means away from the first opening, said electrode means having a sharp point facing in a direction away from the first grid means and toward the second opening, said electrode means is connected to a high voltage negative source, said electrode means is constructed and arranged in relation to the first grid means so that the negatively charged field produced by the first grid means encompasses the electrode means and in combination with the negative potential produced by the electrode means acts to generate a high charge density at its sharp point sufficient to transfer a negative electric charge to atmospheric molecules and particulates adjacent thereto;

a second grid means spaced apart from the electrode means toward the second opening, said second grid means positioned in a plane orthagonal to the axis of the case means and occupying the entire plane extending to the internal surface of the wall of the case means, said second grid means formed of metal wire of circular cross section, providing a tortuous pathway while maintaining minimal impedance to the flow of air through the case means, said second grid means is connected to a positive high voltage source, said second grid means is constructed and arranged so as to attract negatively charged molecules and particulates away from the electrode means causing the molecules and particulates to flow through the case means in a direction toward the second opening of the case means and also serving to provide surface area to which negatively charged particulates will adhere and to which negatively charged molecules will give up their negative charge and flow through; said negative high voltage source and said positive high voltage source are mounted externally of said case means.

2. The device as defined in claim 1 wherein the electrode means is a needle-like device constructed of metal 0.025 inches in diameter and one inch long with a polished surface having one blunt end and having a gradual taper to a fine point at the other end, the electrode means being oriented with its long axis perpendicular to the first grid means, the blunt end being located in close proximity to and near the center of the first grid means, the pointed end facing away from the first grid means.

3. The device as defined in claim 1 wherein the electrode means is a needle-like device constructed of metal 0.025 inches in diameter and one inch long with a polished surface, metalically bonded by one end to the first grid means near its center and having a gradual taper to a fine point at the other end, with the long axis of the electrode means perpendicular to the plane of the first grid means, said metallic bonding making it electrically conductive with the first grid means.

4. The device as defined in claim 1 wherein the first grid means is constructed of one continuous length of 11 gauge metal wire of circular cross section folded back and forth in a plane forming an array of parallel straight segments equally spaced apart and having smooth curves of constant radius at each bend.

5. The device as defined in claim 1 wherein the first grid means is constructed of metal wire which is completely coated with an electrically non-conductive material of sufficient thickness to prevent any electrical penetration or electrical discharge or conduction to the surrounding atmosphere from the negatively charged wire structure of the first grid means.

6. The device as defined in claim 1 wherein the second grid means consists of a plurality of layers of metal screen made from 30 gauge round wire in a rectangular mesh pattern of 16 wires per inch, the layers being assembled in close proximity with each layer in contact with its neighbor.

7. The device as defined in claim 1 wherein the second grid means consists of a plurality of layers of metal screen made from 30 gauge round wire in a rectangular mesh pattern of 16 wires per inch, the layers being assembled in close proximity but spaced apart from each other a uniform fixed distance and incorporating a metallic contact means interconnecting the layers such that all layers are electrically conductive with each other.

8. The device as defined in claim 1 wherein the high voltage source connected to the first grid means and the electrode means is constructed to provide 20,000 volts negative, and wherein the high voltage source connected to the second grid means is constructed to provide 20,000 volts positive, and wherein the second grid means is spaced from the electrode means by three inches.

9. The device of claim 1 wherein the case means further includes air inlet means spaced from said first opening;

the first opening being for the admittance of ambient air from the surrounds of the case means;

the air inlet means being for the admittance of air from the outlet of a forced air convection system, said air inlet means having a gate means that can be opened to admit air from said forced air convection system or closed to prevent the admittance of air from said forced air convection system.

10. The device of claim 9 wherein the gate means comprises a plurality of louvre-like doors freely pivoted along their upper edges such that gravitationally induced forces cause them to hang downward from their pivots, whereby the lower edge of each door meets the upper edge of the door below, closing the air inlet means spaced from the first opening when a forced air convection system is not operating; said doors, being effected by the force of the air from said forced air convection system when it is operating, such that said force against said doors overcomes the gravitational force keeping, said doors in the closed position, causing said doors to open and admit air from said forced air convection system.

11. A device for pumping air and collecting airborne particulates by electrostatic techniques comprising:

a case means, tubular in shape and constructed of electrically non-conductive material, for supporting the components of the device and for providing a channel for the convection of air through the device, having a first opening for the admittance of air and having a second opening for the exit of air, between the openings and within the case means are a plurality of air pumping and particulate collecting arrangements in series, each said arrangement comprising:

a first grid means positioned in a plane orthogonal to the axis of the case means occupying the entire plane extending to the internal surface of the wall of the case means, said first grid means formed of metal wire, said first grid means is connected to a negative high voltage source, said first grid means is constructed and arranged so as to provide a defined negative field across the convection channel within the case means to repel negatively charged molecules or particulates, generated within the case means, away from the first opening and causing them to flow toward the interior of the case means;

an electrode means adjacent to the first grid means near the center of the first grid means and on the side of the first grid means away from the first opening, said electrode means having a sharp point facing away from the first grid means and toward the second opening, said electrode means is connected to a high voltage negative source, said electrode means is constructed and arranged in relation to the first grid means so that the negatively charged field produced by the first grid means encompasses the electrode means and in combination with the negative potential produced by the electrode means acts to generate a high charge density at its sharp point sufficient to transfer a negative electric charge to atmospheric molecules and particulates adjacent thereto;

a second grid means spaced apart from the electrode means toward the second opening, said second grid means positioned in a plane orthogonal to the axis of the case means and occupying the entire plane extending to the internal surface of the wall of the case means, said second grid means formed of metal wire, providing a tortuous pathway with minimal impedance to the flow of air through the case means, said second grid means is connected to a positive high voltage source, said second grid means is constructed and arranged so as to attract negatively charged molecules and particulates away from the electrode means causing the molecules and particulates to flow through the case means in a direction toward the second opening of the case means and also serving to provide surface area upon which negatively charged particulates will adhere and to which negatively charged molecules will give up their charge and flow through;

wherein said negative high voltage source and said positive high voltage source are mounted externally of said case means.

12. A device for pumping air and collecting airborne particulates by electrostatic techniques comprising:

a case means, tubular in shape and constructed of electrically non-conductive material, for supporting the components of the device and for providing a channel for the convection of air through the device, having a first opening for the admittance of air and having a second opening for the exit of air, between the openings and within the case means are a plurality of air pumping and particulate collecting arrangements side of side in parallel, each said arrangement comprising:

a first grid means positioned in a plane orthogonal to the axis of the case means occupying the entire plane extending to the internal surface of the wall of the case means, said first grid means formed of metal wire, said first grid means is connected to a negative high voltage source, said first grid means is constructed and so arranged to provide a defined negative field across the convection channel within the case means to repel negatively charged molecules or particulates, generated within the case means, away from the first opening and causing them to flow toward the interior of the case means;

an electrode means adjacent to the first grid means near the center of the first grid means and on the side of the first grid means away from the first opening, said electrode means having a sharp point facing away from the first grid means and toward the second opening, said electrode means is connected to a high voltage negative source, said electrode means is constructed and arranged in relation to the first grid means so that the negatively charged field produced by the first grid means encompasses the electrode means and in combination with the negative potential produced by the electrode means acts to generate a high charge density at its sharp point sufficient to transfer a negative electric charge to atmospheric molecules and particulates adjacent thereto;

a second grid means spaced apart from the electrode means toward the second opening, said second grid means positioned in a plane orthogonal to the axis of the case means and occupying the entire plane extending to the internal surface of the wall of the case means, said second grid means formed of metal wire, providing a tortuous pathway with minimal impedance to the flow of air through the case means, said second grid means is connected to a positive high voltage source, said second grid means is constructed and arranged so as to attract negatively charged molecules and particulates away from the electrode means causing the molecules and particulates to flow through the case means in a direction toward the second opening of the case means and also serving to provide surface area upon which negatively charged particulates will adhere and to which negatively charged molecules will give up their charge and flow through;

wherein said negative high voltage source and said positive high voltage source are mounted externally of the case means.

13. The device of claim 12 wherein the plurality of arrangements have no case means or other separation means between them and are adjacent and continuous with each other and wherein:

the case means is a one continuous common structure surrounding and encompassing all of the plurality of the arrangements;

the first grid means of the plurality of all of the side by side arrangemenst is formed as a single continuous structure in one plane transecting all air flow paths within the case means;

the electrode means of each of the plurality of all of the side by side arrangements is supported on a common structure in a plane transecting all of the air flow paths;

the second grid means of the plurality of the side by side arrangements is formed as a single continuous structure in one plane transecting all air flow paths within the case means;

the plurality of arrangements within the case means are positioned and arranged such that the air flow paths through each arrangement follows a parallel straight through path, which is adjacent and contiguous with its neighboring arrangements, from the first opening of the case means to the second opening of the case means.

14. A device for pumping air and collecting airborne particulates by electrostatic and convection means comprising:

a case means, tubular in shape and constructed of electrically non-conductive material, for supporting the components of the device and for providing a channel for the convection of air through the device, having a first opening for the admittance of air and having a second opening for the exit of air, between the openings and within the case means are the following:

a first grid means located near the first opening and positioned in a plane orthogonal to the axis of the case means occupying the entire plane extending to the internal surface of the wall of the case means, said first grid means formed of metal wire of circular cross section, said first grid means is connected to a negative high voltage source, said first grid means is constructed and arranged so as to provide a defined negative field across the convection channel within the case means to repel negatively charged molecules and particulates, generated within the case means, away from the first opening and causing them to flow toward the interior of the case means;

an electrode means, adjacent to the first grid means located near the center of the first grid means and on the side of the first grid means away from the first opening, said electrode means having a sharp point facing in a direction away from the first grid means and toward the second opening, said electrode means is connected to a high voltage negative source, said electrode means is constructed and arranged in relation to the first grid means so that the negatively charged field produced by the first grid means encompasses the electrode means and in combination with the negative potential produced by the electrode means acts to generate a high charge density at its sharp point sufficient to transfer a negative electric charge to atmospheric molecules and particulates adjacent thereto;

a second grid means spaced apart from the electrode means toward the second opening, said second grid means positioned in a plane orthogonal to the axis of the case means and occupying the entire plane extending to the internal surface of the wall of the case means, said second grid means formed of metal wire of circular cross section, providing a tortuous pathway while maintaining minimal impedance to the flow of air through the case means, said second grid means is connected to a positive high voltage source, said second grid means is constructed and arranged so as to attract negatively charged molecules and particulates away from the electrode means causing the molecules and particulates to flow through the case means in a direction toward the second opening of the case means and also serving to provide surface area to which negatively charged particulates will adhere and to which negatively charged molecules will give up their negative charge and flow through;

an electric motor driven fan means spaced apart from the second grid means toward the second opening of the case means, said fan means located in a plane orthogonal to the axis of the case means, the blades of said fan means extending toward but not contacting the walls of the case means, said fan means serving to augment the flow of air through the device;

wherein said negative high voltage source and said positive high voltage source are mounted externally of said case means.

* * * * *